I. ROBB & B. A. SELPH.
SCRAPER.

No. 187,177. Patented Feb. 6, 1877.

Witnesses
W. C. McArthur
A. V. Elliott

Inventors.
Isaac Robb & B. A. Selph
T. H. Alexander & Co.
Attorneys

UNITED STATES PATENT OFFICE.

ISAAC ROBB AND BENAMMI SELPH, OF LYNCHBURG, OHIO.

IMPROVEMENT IN SCRAPERS.

Specification forming part of Letters Patent No. 187,177, dated February 6, 1877; application filed January 6, 1877.

*To all whom it may concern:*

Be it known that we, ISAAC ROBB and BENAMMI SELPH, of Lynchburg, in the county of Highland and State of Ohio, have invented certain new and useful Improvements in Road-Scrapers; and we do hereby declare that the following is a full, clear, and exact description thereof, reference being had to the accompanying drawings, and to the letters of reference marked thereon, which form part of this specification:

The nature of our invention consists in the construction and arrangement of a road-scraper, as will be hereinafter more fully set forth.

In order to enable others skilled in the art to which our invention appertains to make and use the same, we will now proceed to describe its construction and operation, referring to the annexed drawing, in which—

Figure 1:
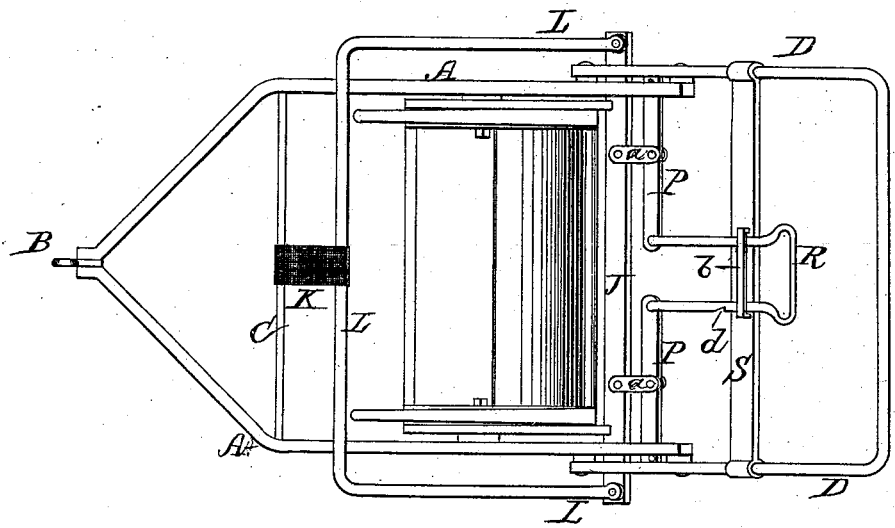
Figure 2:
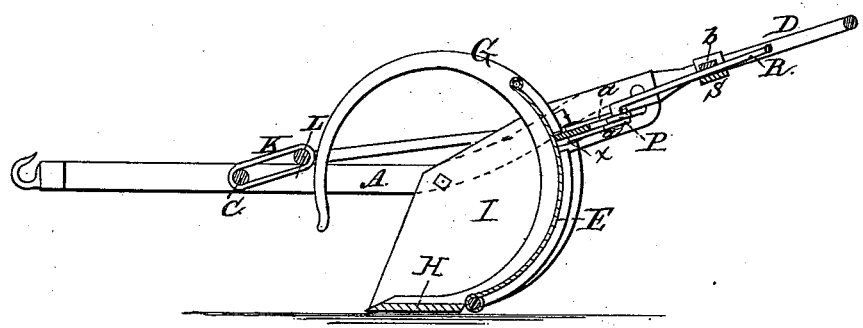

Figure 1 is a plan view of our scraper. Fig. 2 is a longitudinal section of the same.

The frame of our scraper consists of two parallel bent bars, A A, the front ends of which are bent inward and riveted together with a hook, B, between them for attaching the team. At the point where the bars A A bend inward is a rod or bar, C, connecting and bracing them together.

The handle D of the scraper is formed of a bar or rod having its ends bent at right angles, and parallel with each other, said ends being securely fastened to the rear ends of the bars A A, and the handle forming a part of the frame.

The scraper consists of two circle-irons, G G. H is the cutter, also fastened to the circle-irons G G. On the outside of each circle-iron G is secured a plate, I, forming the side of the scraper; and this side plate is so constructed as to project in rear of the circle-iron at its upper end, in which projecting part is a notch, *x*, as shown.

The two side plates I I are pivoted to the side bars A A of the scraper-frame, allowing the scraper to turn in the frame on its pivots. In staples under the rear ends of the bars A A is placed a sliding bar, J, which enters the notches *x x* in the side plates I I, it being held therein by means of a spring, K, which connects the brace-rod C with a bail or stirrup, L, in front of the scraper, the ends of said bail or stirrup being attached to the ends of the sliding bar J. The bar J is by links *a a* connected with two levers, P P, the outer ends of which are pivoted in the staples under the rear ends of the bars A A. The inner ends of the levers P P are connected to a double handle, R, which passes under a staple, *b*, attached to a cross-bar, S, connecting the two arms of the main handle D. In one of the arms of the handle R is a notch, *d*, as shown in Fig. 1.

When the scraper is full the operator pulls the handle R until the notch *d* is caught on the staple *b*, when the bar J has been withdrawn from the notches, and the scraper can then turn over on its pivots until the bar or bail L, pulled back by the motion of the handle R, enters the notches *x* and locks the scraper in a reversed position. The scraper may then be pulled along on the circle-irons G, as upon sleds, until it is desired to reload the same, when the handle R is released from the staple *b*, and the spring K draws the bar L out of the notches *x*. The scraper then turns over again until the bar J springs into the notches *x* and locks it in proper position for scraping. The circle-irons may, in a full-sized machine, be provided with grooves upon their inner sides for the reception of the scraper.

Having thus fully described our invention, what we claim as new, and desire to secure by Letters Patent, is—

1. In a rotating scraper the combination of the circle-irons G G, bottom E, cutter H, and side pieces I I, having notches *x*, and pivoted in the frame A C D, all constructed substantially as and for the purposes herein set forth.

2. The combination, with the rotating scraper G E H, having side pieces I I, with notches *x x*, of the sliding bar J, bail L, spring K, levers P P, handle R, with notch *d*, and bail *b*, all constructed substantially as and for the purposes herein set forth.

In testimony that we claim the foregoing as our own we affix our signatures in presence of two witnesses.

ISAAC ROBB.
BENAMMI SELPH.

Witnesses:
HOUSTON C. ROBB,
JOHN Q. THOMPSON.